UNITED STATES PATENT OFFICE.

GEORGE WALTEMAR DU NAH, OF BLOOMINGTON, ILLINOIS.

COMPOSITION FOR PRESERVING EGGS.

SPECIFICATION forming part of Letters Patent No. 685,750, dated November 5, 1901.

Application filed December 26, 1900. Serial No. 41,101. (No specimens.)

*To all whom it may concern:*

Be it known that I, GEORGE WALTEMAR DU NAH, a resident of Bloomington, in the county of McLean and State of Illinois, have invented certain new and useful Improvements in Compositions for Preserving Eggs; and I do hereby declare the following to be a full, clear, and exact description of the invention, such as will enable others skilled in the art to which it appertains to make and use the same.

My invention relates to an improved composition for preserving eggs, the object of the invention being to provide an improved composition or compound which when an egg is immersed therein will hermetically seal the shell and protect the egg from climatic influences by forming an air-tight closure around the egg.

With this object in view the invention consists in a composition or compound comprising one hundred per cent. of soft water, thirty per cent. of lime, three per cent. of sulfuric acid, two per cent. of magnesia, and one per cent. of Hoffman's anodyne, and these ingredients are thoroughly mixed together.

In carrying out my process I immerse the eggs in the composition or compound above described, which, adhering to the shell and filling the pores thereof, hermetically seals the same and makes the shell air-tight, excluding all air and protecting the egg from climatic influences, thus preventing the egg from spoiling and maintaining it fresh for an indefinite time.

Having fully described my invention, what I claim as new, and desire to secure by Letters Patent, is—

A preserving compound or composition consisting of a mixture of water, lime, sulfuric acid, magnesia and Hoffman's anodyne.

In testimony whereof I have signed this specification in the presence of two subscribing witnesses.

GEORGE WALTEMAR DU NAH.

Witnesses:
 CHAS. HOGG,
 LOTTIE B. RANKIN.